(12) United States Patent
Finnegan et al.

(10) Patent No.: US 7,160,939 B2
(45) Date of Patent: Jan. 9, 2007

(54) ACTIVE MASTERBATCH FOR PRODUCTION OF CO2 GENERATING MASTERBATCH

(76) Inventors: Michael J. Finnegan, 13855 Lake Shore Dr., Clive, IA (US) 50325; Wesley L. Boldt, 2870 Druid Hill Rd., Des Moines, IA (US) 50315

( * ) Notice: Subject to any disclaimer, the term of this patent is extended or adjusted under 35 U.S.C. 154(b) by 0 days.

(21) Appl. No.: 10/879,784

(22) Filed: Jun. 29, 2004

(65) Prior Publication Data

US 2005/0001204 A1 Jan. 6, 2005

Related U.S. Application Data

(60) Provisional application No. 60/484,421, filed on Jul. 2, 2003.

(51) Int. Cl.
- *C08J 3/00* (2006.01)
- *C08K 3/00* (2006.01)
- *C08K 3/20* (2006.01)
- *C08K 5/09* (2006.01)
- *C08L 57/02* (2006.01)

(52) U.S. Cl. .................. 524/320; 264/45.3; 264/54; 264/331.17; 428/34.1; 428/34.3; 428/35.2; 428/35.7; 428/36.5; 524/284; 524/321; 524/424; 524/425; 524/499; 523/351; 521/97; 521/142

(58) Field of Classification Search ............... 524/284, 524/321, 424, 425, 499, 320; 264/45.3, 54, 264/331.17; 428/34.1, 34.3, 35.2, 35.7, 36.5; 521/97, 142; 523/351
See application file for complete search history.

(56) References Cited

U.S. PATENT DOCUMENTS 3,950,484 A * 4/1976 Egli .................. 264/45.5
2002/0198123 A1 * 12/2002 Nitzsche .................. 510/188

\* cited by examiner

*Primary Examiner*—Patrick D. Niland

(57) ABSTRACT

A compound permitting the economic production of packaging containers, which when activated produces concentrated amounts of CO2 gas for extended periods for preservation of perishable products therein, comprises a mixture including a CO2 generating portion incorporated within a polymer matrix. Preferably, the mixture includes citric acid; calcium carbonate, and polyethylene resin. More preferably, the mixture includes a mixture of a carboxylic acid (0.1–40%); a hydrogen carbonate (0.1–40%) and any polyolefin resin. Even more preferably, the mixture includes a mixture including (0.01–40%) Citric Acid; (0.01–40%); and 30–75% polyethylene resin. Most preferably, the mixture includes by weight 12% citric acid; 38% calcium carbonate; and 50% low density polyethylene resin with a melt index of 20 and a density of 0.924 g/cc. Alternatively, the carboxylic acid and hydrogen carbonate components are compounded into separate polymer matrixes, and later combined. The compound may be packaged in containers that are formed of flexible or rigid material.

10 Claims, No Drawings

ACTIVE MASTERBATCH FOR PRODUCTION OF CO2 GENERATING MASTERBATCH

CROSS-REFERENCE TO RELATED APPLICATION

This application claims the benefit of U.S. Provisional Application No. 60/484,421, filed on Jul. 2, 2003.

BACKGROUND OF THE INVENTION

Conventional Modified Atmosphere Packaging (MAP) is produced by gas flushing barrier packages with a mixture of Gases including CO2. This requires capital investment in equipment, special packaging materials, and the gas. The ability to packaging material or film to self generate an efficacious amount of carbon dioxide upon activation would eliminate some of these costs but still deliver the benefits of CO2 in perishable product preservation.

Therefore, a principle object of the invention is to provide active packaging materials that generate CO2 on conventional plastics processing equipment.

Another object of the invention is to provide active packaging materials that generate CO2 on conventional plastics processing equipment, where the carboxylic acid and hydrogen carbonate components are compounded into separate polymer matrixes, and later combined.

These and other objects will be apparent to those skilled in the art.

SUMMARY OF THE INVENTION

A compound permitting the economic production of packaging containers, which when activated produces concentrated amounts of CO2 gas for extended periods for the preservation of perishable products therein, comprises a mixture including a CO2 generating portion incorporated within a polymer matrix. Preferably, the mixture includes citric acid; calcium carbonate, and polyethylene resin. More preferably, the mixture includes a mixture of a carboxylic acid (0.1–40%); a hydrogen carbonate (0.1–40%) and any polyolefin resin. Even more preferably, the mixture includes a mixture including (0.01–40%) Citric Acid; (0.01–40%); and 30–75% polyethylene resin. Most preferably, the mixture includes by weight 12% citric acid; 38% calcium carbonate; and 50% low density polyethylene resin with a melt index of 20 and a density of 0.924 g/cc. Alternatively, the carboxylic acid and hydrogen carbonate components are compounded into separate polymer matrixes, and later combined. The compound may be packaged in containers that may be formed of flexible or rigid material.

DESCRIPTION OF THE PREFERRED EMBODIMENT

This invention consists of a blend of materials that includes a polyolefin resin intended for use in compounding, and powdered chemistry capable of reacting with moisture to generate Carbon Dioxide gas. This combination forms a Masterbatch concentrate suitable for blending with other melt processable polymers for subsequent forming into blown, cast or molded Plastic Products.

The purpose of the invention is to permit the economical production of both flexible films and rigid packaging containers that (when properly activated) produce controlled amounts of CO2 gas for extended periods, thereby facilitating the preservation of perishable products stored therein.

Most commercial blown and cast film extrusion equipment lacks the capability to effectively blend and mix direct powdered additives into their melt streams without capital modifications. Even with materials handling equipment, typical extrusion screw designs are not engineered to provide uniform dispersions of dry powdered additives in the particle size range of 20–500 microns.

Technical Studies have proven the beneficial effect controlled generation of carbon dioxide gas can have on preserving post harvest fruits, vegetables, and other flora/agricultural crops. Further work confirms the value of controlled generation of CO2 in the packaging and preservation of meats, poultry, and seafood. The principle of this invention is a cost effective method and formula to produce a Masterbatch that contains measured amounts of a carboxylic acid and a hydrogen carbonate that are designed to 'survive' the heat, pressure, and shear conditions common to plastics processing, that when blended with appropriate polyolefin resins can be converted into "Active" films or packaging on conventional plastics processing equipment.

A compound formed in accordance with the present invention permits the economic production of packaging containers, which when activated will produce concentrated amounts of CO2 gas for extended periods for the preservation of perishable products therein. The compound comprises a mixture including a CO2 generating portion incorporated within a polymer matrix. Preferably, the mixture includes citric acid; calcium carbonate, and polyethylene resin. More preferably, the mixture includes a mixture of a carboxylic acid (0.1–40%); a hydrogen carbonate (0.1–40%) and any polyolefin resin. Even more preferably, the mixture includes a mixture including (0.01–40%) Citric Acid; (0.01–40%); and 30–75% polyethylene resin. Most preferably, the mixture includes by weight 12% citric acid; 38% calcium carbonate; and 50% low density polyethylene resin with a melt index of 20 and a density of 0.924 g/cc.

The compound of the present invention may be packaged in containers that when activated will produce concentrated amounts of CO2 gas for extended periods for the preservation of perishable products in the container. These containers may be formed of flexible or rigid material.

EXAMPLE 1

Initial Masterbatch was 50% solids and 50% Polyethylene with a recipe of: BY WEIGHT Citric Acid+38% by weight Calcium carbonate+50% Linear Low Density Polyethylene resin with a Melt Index of 20 and a density of 0.924 g/cc. Other samples produced at 55, 60, 65, and 70 percent solids have also been produced.

Alternatively, the carboxylic acid component and the hydrogen carbonate components may be compounded individually into separate polymer matrixes using the same mixtures described above, which are later combined into a final compound. This binary approach reduces processing costs, increases flexibility in formulation developments, and shelf stability in the presence of humidity.

Specifically, the carboxylic acid is dispersed within a first polymer matrix to form a first compound. Preferably, the carboxylic acid within the first polymer matrix is 0.5–90% by weight of the first compound. More preferably, the first compound comprises a mixture of 33% by weight Citric acid and 67% by weight polyethylene.

Likewise, the hydrogen carbonate base is dispersed within a second polymer matrix to form a second compound.

Preferably, the hydrogen carbonate base within the second polymer matrix is 0.5–90% by weight of the second compound. More preferably, the second compound comprises 55% by weight calcium carbonate and 45% by weight polyethylene.

The first and second polymer matrixes can be formed of the same or different materials. The first compound and second compound are later combined to disperse a mixture including the carboxylic acid and the hydrogen carbonate base within a primary polymer matrix (being a mixture of first and second polymer matrixes) to form a primary compound. The primary compound may then be formed into a packaging material.

EXAMPLE 2

Individual Masterbatch compounds were produced by producing a first component (COMPONENT A) by mixing 67% polyethylene with 33% Citric acid, and a second component (COMPONENT B) 45% Polyethylene with 55% calcium carbonate, respectively. Once formed, binary Components A and B were later combined in a ratio of 40% Component A and 60% Component B to produce a 50 micron monolayer blown film that generated carbon dioxide upon exposure to an ambient humidity of 90% RH at 72 degrees F.

$CO_2$ Generating Material

The $CO_2$ generating material of the present invention contains a mixture of a carboxylic acid and a hydrogen carbonate base. The basic technology for combining a carboxylic acid with a hydrogen carbonate base in the presence of moisture to generate carbon dioxide gas is covered by several existing and expired patents. The carboxylic acid can be any acid or combination of acids that, when reacted with a base or combination of bases, results in the production of carbon dioxide. The carboxylic acid can be aliphatic or aromatic.

Aliphatic acids include, but are not limited to, Formic acid, Acetic acid, Propionic acid, Butyric acid, Valeric acid, Caproic acid, Enanthic acid, Caprylic acid, Pelargonic acid, Capric acid, Propiolic acid, Vinylformic acid, Glyoxylic acid, Glycollic acid, 3-Butynoic acid, Crotonic acid, Vinylacetic acid, Pyruvic acid, Isobutyric acid, Oxalic acid, Lacctic acid, trans-2-Penten-4-ynoic acid, Propargylacetic acid, Pent-2-enoic acid, Allylacetic acid, Isovaleric acid, Valeric acid, Malonic acid, alpha-Hydroxybutyric acid, 2-Methyllactic acid, 2-Furoic acid, Sorbic acid, trans,cis-2,4-Hexadienoic Acid, D,L-Propargylglycine, Acetylenedicarboxylic acid, Hydrosorbic acid, beta-Propylacrylic acid, Strawberiff (IFF), Maleic acid, Fumaric acid, Levulinic acid, Caproic acid, 3-Methyl valeric acid, Succinic acid, 2-Heptenoic acid, cis-Hept-3-enoic acid, Methylenesuccinic acid, Oenanthic acid, Oxalacetic acid, Glutaric acid, Peroxyhexanoic acid, Malic acid, alpha-Toluic acid, Furylacrylic acid, trans,trans-Muconic acid, trans-Oct-2-enoic acid, cis-Oct-3-enoic acid, 4-Ethyl-hex-2-enoic acid, trans-3-Hexenedioic acid, Caprylic acid, 2-Ethylcaproic acid, alpha-Ketoglutaric acid, Phenylpropiolic acid, Adipic acid, D-Tartaric acid, Hydrocinnamic acid, p-Hydroxyphenylacetic acid, o-Hydroxyphenylacetic acid, (S)-Mandelic acid, (R)-Mandelic acid, cis-Non-3-enoic acid, alpha-Nonenoic acid, Pelargonic acid, Pimelic acid, 4-Phenyl-but-3-ynoic acid, Peroxyoctanoic acid, 4,6-Decadiynoic acid, p-Hydroxybenzoylformic acid, 4,6-Decadiyne-1,10-dioic acid, (R)-p-Hydroxymandelic acid, p-Hydroxymandelic acid, racemate, (S)-p-Hydroxymandelic acid, 4-Decynoic acid, 4-Ethyl-2-octenoic acid, Dec-3-enoic acid, 6-Acetoxy-5-hexenoic acid, 6-Acetoxy-4-hexenoic acid, 4-Ethylcaprylic acid, Capric acid, Aconitic acid, Suberic acid, 5-Phenyl-pent-4-ynoic acid, Vitamin C, alpha-Mercapto-caprylate, Diperoxyadipic acid, 4-Oxo-4-phenyl-butyric acid, 5-Phenyl valeric acid, Hendecynoic acid, 5-Cyclohexyl-2-pentenoic acid, Cyclohexyl n-valerate, Undecylenic acid, 2-Hendenoic acid, 1-Naphthylacetic acid, trans-10-Hydroxy-dec-8-enoic Acid, Undecanoic acid, Azelaic acid, Peroxydecanoic acid, Benzo[1,3]dioxol-5-yl-propynoic Acid, Hexanoic acid, carboxy-hydroxy-methyl ester, Citric acid, Quinic acid, D-Gluconic acid, 10-Dodecynoic Acid, 9-Dodecynoic acid, 3-Dodecynoic Acid, 7-Dodecynoic acid, 8-Dodecynoic acid, 9-Dodecenoic acid, Dodec-2-enoic acid, 6-Dodecenoic acid, 7-Dodecenoic acid, 3-Methyl-undec-5-enoic acid, cis-5-Dodecenoic acid, 10-Dodecenoic Acid, 8-Dodecenoic acid, 3,8-Dimethyl-dec-5-enoic acid, Dodec-11-enoic acid, Al3-05999, 9-Methyl-undecanoic acid, Lauric acid, 3-Methyl-undecanoic acid 4-Oxo-6-phenyl-hex-5-ynoic acid, beta-Naphthoxyacetic acid, Sebacic acid, alpha-Mercapto-caprate, 4-Oxo-6-phenyl-hexanoic acid, Galactaric acid, trans,trans-2,12-Tridecadienoic acid, 3,5-Dimethyl-undec-5-enoic acid, 12-Tridecenoic acid, trans-Tridec-2-enoic acid, 11-Methyl-dodecanoic acid, 10-Methyldodecanoic acid, Tridecylic acid, 12-Amino-dodecanoic acid, 2-(3-phenyl-prop-2-ynylidene)-malonic acid, Tetradeca-7,11-diene-5,9-diynoic Acid, alpha-Hydroxy-laurate, 8-Cyclohexyl-octanoic acid, 3-Ethyl-dodec-5-enoic acid, Tetradec-2-enoic acid, Myristoleic acid, cis,cis-5,8-Dihydroxy-2,6-dodecadienoic acid, 11-Methyl-tridecanoic acid, Myristic acid, Aseanostatin P1, Decamethylenedicarboxylic acid, alpha-Mercapto-laurate, Diperoxysebacic acid, cis-10-Pentadecenoic acid, 2-(2-Cyclopentyl-ethyl)-octanoic acid, 13-Methylmyristate, Sarcinic acid, Pentadecyclic acid, 1,13-Tridecanedioic acid, alpha-Hydroxymyristic acid, Decanoic acid, carboxy-hydroxy-methyl ester, 2-(3-Cyclopentenyl)-undecanoic acid, cis,cis-14-Methyl-5,9-pentadecadienoic acid, Palmitelaidic acid, 2-(2-Propenyl)-tridecanoic acid, 2-(2-Cyclopentyl-ethyl)-nonanoic acid, Palmitoleic acid, 2-(4-Cyclohexyl-butyl)-hexanoicacid, 2-(2-Cyclohexyl-ethyl)-octanoic acid, 2-Cyclopropylmethyl-dodecanoic acid, 2-Cyclohexylmethyl-nonanoic acid, trans-2-hexadecenoic acid, 2-Heptyl-2-nonenoic acid, 2-Butyl-dodecanoic acid, Palmitic acid, 14-Methylpentadecanoic acid, Anteisopalmitic acid, 2-Heptyl-nonanoic acid, 2-Hexyldecanoic acid 1,12-Dodecanedicarboxylic acid, alpha-Mercapto-myristate, 2-(3-Cyclopentenyl)-dodecanoic acid, 2-(2-Propenyl)-tetradecanoic acid, 2-(4-Cyclohexyl-butyl)-heptanoic acid, 2-Cyclobutylmethyl-dodecanoic acid, 2-(2-Cyclopentyl-ethyl)-decanoic acid, 2-(3-Cyclohexyl-propyl)-octanoic acid, 2-(2-Cyclohexyl-ethyl)-nonanoic acid, cis-10-Heptadecenoic acid, 2-(Methylcyclohexyl)-decanoic acid, 2-Butyl-12-tridecenoic acid, 2-(Methylcyclopropyl)-tridecanoic acid, 2-Cyclohexyl-undecanoic acid, cis,cis-8-Acetoxy-5-hydroxy-2,6-dodecadienoic acid, 15-Methyl-hexadecanoic acid, 2-Heptyl-decanoic acid, 14-Methylpalmitic acid, Margaric acid, 2-Hydroxypalmitic acid, gamma-Linolenic acid, Linolenic acid, alpha-Elaeostearic acid, beta-Elaeostearic acid, cis,cis-6,12-Octadecadienoic acid, 8-Octadecynoic acid, Isolinoleic acid, 10-Octadecynoic acid, 12-Octadecynoic acid, 14-Octadecynoic acid, 6-Octadecynoic acid, 4-Octadecynoic acid, cis,cis-7,12-Octadecadienoic acid, 2-Octadecynoic acid, 7-octadecynoic acid, cis,cis-5,12-Octadecadienoic acid, cis,cis-8,12-Octadecadienoic acid, 5-Octadecynoic acid, 17-Octadecynoic acid, Chaulmoogric acid, 13-Octadecynoic Acid, 15-Octadecynoic acid, 11-Octadecynoic acid, Linolelaidic acid, Linoleic acid, trans,trans-10,12-Octadecdienoic acid, Cilienic acid, cis,cis-6,10-Octadecadienoic acid, 9-Stearolic acid, 2-(2-Cyclohexyl-ethyl)-4-cyclohexyl-butanoic acid, Oleic acid, trans-10-Octadecenoic Acid, Dihydrochaulmoogric acid, 14-Octadecenoic acid, 15-Octadecenoic acid, 17-Octadecenoic acid, 2-(2-Cyclohexyl-ethyl)-decanoic acid, cis-5-Octadecenoic acid, 2-(4-Cyclohexyl-butyl)-octanoic acid, 2-Octyl-2-decenoic acid, 2-Cyclohexyl-dodecanoic acid, 2-(2-Propenyl)-pentadecanoic acid, cis-12-Octadecenoic acid, cis-Vaccenic acid, Octadec-2-enoic acid, trans-Vaccenic acid, Petroselinic acid, 4-Octadecenoic acid, Petroseladic acid, trans-12-Octadecenoic acid, Isooleic acid, 2-(3-Cyclohexyl-propyl)-nonanoic acid, cis-7-Octadecenoic acid, cis-8-Octadecenoic acid, 2-Cyclopentyl-tridecanoic acid, cis-13-Octadecenoic acid, Elaidic acid, cis-2-Methoxy-5-hexadecenoic acid, 11-Cyclohexyl-9-hydroxy-undecanoic acid, cis-2-Methoxy-6-hexadecenoic acid, 2-Ethylhexadecanoic acid, Stearic acid, Isostearic acid, 15-Methyl-heptadecanoic acid, Tridecanoic acid, carboxy-hydroxy-methyl ester, alpha-Mercapto-palmitate, 9,10-Epoxylinolenic acid, 9-Hydroxylinolenic acid, 13-Hydroxylinolenic acid, 16-Hydroxylinolenic acid, 270. 15-Epoxylinolenic acid, 2-(2-Cyclopent-2-enyl-ethyl)-dodecanoic acid, 5-Cyclohexyl-2-(2-cyclohexyl-ethyl)-pentanoic acid, Ricinstearolic acid, 12-Epoxylinoleic acid, 13-Hydroxylinoleic acid, Lactisaric acid, 9-Hydroxylinoleic acid, 9-Epoxylinoleic acid, cis-7-Nonadecenoic acid, trans-7-Nonadecenoic Acid, 2-Cyclohexyl-tridecanoic acid, Ricinoleic acid, Ricinelaidic acid, Oxidooleic acid, trans-8-(3-Octyl-oxiranyl)-octanoic Acid, Nonadecylic acid, 17-Methyloctadecanoic acid, 16-Methyl-octadecanoic acid, 12-Hydroxy-stearic acid, alpha-Hydroxystearic acid, Arachidonic acid, Pulvic acid, Arachidic acid, 3RS,7R,11R-Phytanic acid, 18-Methyl-nonadecanoic acid, 9,10-Dihydroxy-stearic acid, alpha-Mercapto-stearate, 9-Oxo-13-prostenoic acid, Cibaric acid, Protolichesterinic acid, 9-Oxoprostanoic acid, Cervonic acid, Hexadecanoic acid, carboxy-hydroxy-methyl ester, trans-9,12,13-Trihydroxy-10-octadecenoic Acid, Clupanodonic acid, 9,10,12-Trihydroxy-stearic acid, Erucic acid, Brassidic acid, Acetyl aleuritolic acid, Sativic acid, alpha-Disulfodicaprylate, Nervonic acid, Rangiformic acid, cis-6,7,8-Triacetoxy-5-hydroxy-2-decenoic acid, alpha-Disulfodicaprate, Laricic acid, alpha-Disulfodilaurate, 2-Amino-succinic acid, 1-(4-octadecanoyloxy-butyl) ester, alpha-Disulfodimyristate, alpha-Disulfodipalmitate, and alpha-Disulfodistearate.

Aromatic acids include, but are not limited to, Benzoic acid, Anthranilic acid, m-Salicylic acid, Salicylic acid, p-Salicylic acid, Anisic acid, m-Anisic acid, 6-Methylsalicylic acid, o-Anisic acid, 4-Amino-salicylic acid, Protocatechuic acid, gamma-Resorcylic acid, alpha-Resorcylic acid, beta-Resorcylic acid, o-Pyrocatechuic acid, Gentisic acid, Piperonylic acid, Terephthalic acid, Phthalic acid, 3-Formyl-4-hydroxy-benzoic acid, 3-Ethyl-2-hydroxy-benzoic acid, Isovanillic acid, o-Vanillic acid, p-Osellinic acid, 4-Methoxy-salicylic acid, Orsellic acid, Vanillic acid, 5-Methoxy-salicylic acid, Pyrogallolcarboxylic acid, Phloroglucinic acid, Gallic acid, Acetylsalicylic acid, 6-Hydroxy-benzo[1,3]dioxole-5-carboxylic acid, Monoperphthalic acid, 3,5-Dimethoxy-benzoic acid, 2,5-Dimethoxybenzoic acid, Veratric acid, 2,6-Dimethoxybenzoic acid, beta-Orcincarboxylic acid, o-Veratric acid, 3,5-Dihydroxy-p-anisic acid, alpha-Hydroxynaphthalic acid, beta-Hydroxynaphthalic acid, Divaric acid, Syringic acid, 3,4-Dimethoxy-5-hydroxybenzoic acid, 4,6-Dimethoxysalicylic acid, Oxy-beta-Ocrincarboxylic acid, 4-(5-Hydroxy-pentyl)-benzoic acid, 6-Pentyl-salicylic acid, 2-Acetylaminogentisic acid, 2,4,5-Trimethoxybenzoic acid, Eudesmic acid, 2,4,6-Trimethoxybenzoic acid, o-Phenoxy-benzoic acid, m-Phenoxybenzoic acid, Taboganic acid, Olivetolic acid, 4-(5-Hydroxy-pentyloxy)-benzoic acid, 3-Hydroxy-5-phenoxy-benzoic acid, 2-(2-Hydroxy-phenoxy)-benzoic acid, 3-(3-Hydroxy-phenoxy)-benzoic acid, 4'-Hydroxy-3-phenoxybenzoic acid, 5-Hexyl-2,4-dihydroxy-benzoic acid, p,p'-Diphenic acid, 3-(4-Methoxy-phenoxy)-benzoic acid, 2-(3-Phenyl-propynoyl)-benzoic acid, 6-Octyl-salicylic acid, 2-(4-Carboxy-phenoxy)-benzoicacid, Olivetonic acid, 4-(5-Carboxy-3-hydroxy-phenoxy)-benzoic Acid, 6-Decyl-salicylic acid, 3,7-Dihydroxy-dibenzofuran-1,9-dicarboxylic acid, 6-Dodecyl-salicylic acid, Lecanoric acid, Anacardic acid, 6-[8(Z),11(Z)-Pentadecadienyl] salicylic acid, 6-[8(Z)-Pentadecenyl] salicylic acid, 6-Pentadecyl-salicylic acid, Parellic acid, 2,4-Dihydroxy-6-pentadec-8-enyl-benzoic acid, cis,cis,cis-2-Heptadeca-3,6,9-trienyl-6-hydroxy-benzoic acid, cis,cis-2-Heptadeca-6,9-dienyl-6-hydroxy-benzoic acid, Protocetraric acid, cis-2-Heptadec-10-enyl-6-hydroxy-benzoic acid, Divaricatic acid, cis-2-Hydroxy-6-nonadec-12-enyl-benzoic acid, Sphaerophorin, 6-Eicosyl-salicylic acid, 2-(10-Acetoxy-pentadec-8-enyl)-4,6-dihydroxy-benzoic acid, Anziaic acid, cis-2-Heneicos-15-enyl-6-hydroxy-benzoic acid, alpha-Collatolic acid, and Microphyllic acid.

The hydrogen carbonate base can be any base that, when reacted with a carboxylic acid, results in the production of carbon dioxide. Preferably, the base is a carbonate, bicarbonate, tricarbonate, etc. More preferably, the base is a metal carbonate, metal bicarbonate, metal tricarbonate, etc. Examples of such carbonates, bicarbonates, and tricarbonates, etc. include, but are not limited to, calcium carbonate, sodium carbonate, lithium carbonate, potassium carbonate, calcium bicarbonate, sodium bicarbonate, lithium bicarbonate, and potassium bicarbonate, etc.

Additional description of the $CO_2$ generating material used according to the present invention is found in U.S. Pat. No. 6,340,654, the disclosure of which is hereby expressly incorporated herein by reference in its entirety.

This invention will be useful to produce either rigid or flexible packaging materials that are "Active Packages" capable of preserving perishable products through the generation of CO2 upon activation. Both the single component and the binary component embodiments may be converted or formed into rigid or flexible materials.

It is therefore seen that this invention will achieve at least its stated objective.

We claim:

1. A compound to permit the economic production of packaging containers that when activated will produce concentrated amounts of CO2 gas for extended periods for the preservation of perishable products therein, comprising:
    a mixture having by weight 12% citric acid; 38% calcium carbonate; 50% low density polyethylene resin with a melt index of 20 and a density of 0.924 g/cc.

2. A compound to permit the economic production of packaging containers that when activated will produce concentrated amounts of CO2 gas for extended periods for the preservation of perishable products therein, consisting of: citric acid; calcium carbonate, and polyethylene resin.

3. A method for the economic production of packaging materials that when activated will produce concentrated amounts of CO2 gas for extended periods, comprising the steps of:
    dispersing carboxylic acid with a first polymer matrix to form a first compound;

dispersing a hydrogen carbonate base within a second polymer matrix to form a second compound;

combining first compound and second compound to disperse a mixture including the carboxylic acid and the hydrogen carbonate base within a primary polymer matrix to form a primary compound;

forming the primary compound into a packaging material; and wherein the carboxylic acid within the first polymer matrix is 0.5–90% of the first compound by weight.

4. The method of claim 3, wherein the first compound comprises a mixture of 33% by weight Citric acid and 67% by weight polyethylene.

5. The method of claim 3, wherein the hydrogen carbonate base within the second polymer matrix is 0.5–90% by weight of the second compound.

6. The method of claim 5, wherein the second compound comprises 55% by weight calcium carbonate and 45% by weight polyethylene.

7. The method of claim 3, wherein the primary polymer matrix is a polyolefin.

8. The method of claim 7, wherein polyolefin is a polyethylene.

9. The method of claim 8, wherein the mixture includes by weight (0.01–40%) Citric Acid; (0.01–40%) hydrogen carbonate base; and 30–75% polyethylene resin.

10. The method of claim 3, wherein the packaging material when activated will produce concentrated amounts of $CO_2$ gas for extended periods for the preservation of perishable products in proximity with the packaging material.

* * * * *